Feb. 2, 1937. W. A. COHEN 2,069,646
ROTARY ENGINE
Filed April 19, 1933 5 Sheets-Sheet 1

INVENTOR.
William A. Cohen
BY
ATTORNEY.

Feb. 2, 1937. W. A. COHEN 2,069,646
ROTARY ENGINE
Filed April 19, 1933 5 Sheets-Sheet 2

INVENTOR.
William A. Cohen
BY
*James + Franklin*
ATTORNEY.

Feb. 2, 1937.                W. A. COHEN                2,069,646
                             ROTARY ENGINE
                         Filed April 19, 1933        5 Sheets-Sheet 4

| 1 | 2 | 3 | 4 | 5 | 6 | 7 | 8 | 9 | 10 | 11 | 12 | 13 |
|---|---|---|---|---|---|---|---|---|----|----|----|----|
| 0° | 0° | 45°0' | 0° | 90°0' | 90°0' | 0° | 0° | 9.1 | 1.000 | 1.000 | 111.5 | 97.0 |
| 15° | 1°55' | 46°55' | 14°31' | 104°31' | 75°29' | 20°45' | 20°45' | 9.74 | 1.07 | 1.093 | 102.0 | 87.3 |
| 30° | 5°20' | 52°15' | 12°3' | 116°34' | 63°26' | 18°29' | 39°14' | 11.87 | 1.305 | 1.41 | 79.2 | 64.5 |
| 45° | 7°45' | 60°0' | 8°42' | 125°16' | 54°44' | 15°30' | 54°44' | 15.31 | 1.681 | 1.96 | 57.0 | 42.3 |
| 60° | 9°18' | 69°18' | 5°38' | 130°54' | 49°6' | 13°3'-30" | 67°47'30" | 20.37 | 2.24 | 2.788 | 40.0 | 25.3 |
| 75° | 10°9' | 79°27' | 3°6' | 134°0' | 46°0' | 11°28'30" | 79°16' | 23.6 | 2.595 | 3.455 | 32.3 | 17.6 |
| 90° | 10°33' | 90°0' | 1°0' | 135°0' | 45°0' | 10°44' | 90°0' | 28.35 | 3.115 | 4.325 | 25.8 | 11.1 |
| 105° | 10°33' | 100°33' | -1°0' | 134°0' | 46°0' | 10°44' | 100°44' | 33.04 | 3.63 | 5.33 | 20.9 | 6.2 |
| 120° | 10°9' | 110°42' | -3°6' | 130°54' | 49°6' | 11°28'30" | 112°12'30" | 37.4 | 4.12 | 6.29 | 17.7 | 3.0 |
| 135° | 9°18' | 120°0' | -5°33' | 125°16' | 54°44' | 13°3'-30" | 125°16' | 41.4 | 4.55 | 7.16 | 15.6 | 1.0 |
| 150° | 7°45' | 127°45' | -8°42' | 116°34' | 63°26' | 15°30' | 140°46' | 44.83 | 4.93 | 7.94 | 14.6 | ±0 |
| 165° | 5°20' | 133°5' | -12°3' | 104°31' | 75°29' | 18°29' | 159°15' | 47.0 | 5.17 | 8.45 | 13.2 | -1.5 |
| 180° | 1°55' | 135°0' | -14°31' | 90°0' | 90°0' | 20°45' | 180°0' | 47.6 | 5.23 | 8.59 | 13.0 | -1.7 |

*Fig.12*

| | 14 | 15 | 16 | 17 | 18 | 19 | 20 | 21 | 22 | 23 | 24 | 25 | 26 | 27 | 28 | 29 |
|---|----|----|----|----|----|----|----|----|----|----|----|----|----|----|----|----|
| 0° | 474 | 460 | 9.98 | 4.99 | 4.99 | 2295 | 2295 | -22 | -22 | .1083 | .1083 | 248 | 248 | -2.38 | -2.38 | 0 |
| 15° | 434 | 420 | 10.10 | 6.45 | 3.65 | 2710 | 1535 | -17 | -22 | .1293 | .0863 | 351 | 133 | -1.47 | -2.84 | 219 |
| 30° | 337 | 323 | 10.68 | 7.96 | 2.72 | 2570 | 880 | 0 | 0 | .1422 | .0702 | 366 | 62 | .0 | .0 | 304 |
| 45° | 238 | 224 | 11.78 | 9.45 | 2.33 | 2115 | 522 | 8 | 16 | .1510 | .0590 | 320 | 30.8 | .47 | 2.42 | 287 |
| 60° | 170 | 156 | 13.31 | 10.97 | 2.34 | 1710 | 365 | 18 | 47 | .1525 | .0538 | 261 | 19.7 | .97 | 7.17 | 235 |
| 75° | 137 | 123 | 15.11 | 12.39 | 2.72 | 1525 | 335 | 29 | 92 | .1525 | .0555 | 232 | 18.6 | 1.61 | 14.0 | 201 |
| 90° | 110 | 96 | 17.19 | 13.72 | 3.47 | 1320 | 333 | 39 | 152 | .1493 | .0607 | 197 | 20.2 | 2.37 | 22.7 | 156 |
| 105° | 89 | 75 | 19.47 | 14.83 | 4.63 | 1113 | 347 | 48 | 218 | .1440 | .0694 | 160 | 24.1 | 3.33 | 31.4 | 108 |
| 120° | 75 | 61 | 21.55 | 15.62 | 6.02 | 954 | 367 | 59 | 277 | .1420 | .0794 | 135 | 29.1 | 4.7 | 39.4 | 71 |
| 135° | 67 | 53 | 23.34 | 15.7 | 7.64 | 833 | 405 | 99 | 400 | .1405 | .0920 | 117 | 37.3 | 9.1 | 56.3 | 32 |
| 150° | 60 | 45 | 24.93 | 15.47 | 9.46 | 697 | 427 | 175 | 513 | .1370 | .1023 | 95 | 43.7 | 17.9 | 70.3 | -1 |
| 165° | 56 | 42 | 25.76 | 14.47 | 11.29 | 608 | 474 | 318 | 563 | .1320 | .1170 | 80 | 55.5 | 37.2 | 74.5 | -13 |
| 180° | 55 | 41 | 25.8 | 12.9 | 12.9 | 528 | 528 | 484 | 484 | .1250 | .1250 | 66 | 66 | 60.5 | 60.5 | 0 |

INVENTOR.
William A. Cohen
BY
ATTORNEY.

Feb. 2, 1937. W. A. COHEN 2,069,646
ROTARY ENGINE
Filed April 19, 1933 5 Sheets-Sheet 5

INVENTOR.
William A. Cohen
BY
James & Franklin
ATTORNEY.

Patented Feb. 2, 1937

2,069,646

UNITED STATES PATENT OFFICE 2,069,646

ROTARY ENGINE

William A. Cohen, Brooklyn, N. Y.

Application April 19, 1933, Serial No. 666,829

25 Claims. (Cl. 123—8)

This invention relates to rotary engines, and more particularly to an internal combustion engine of the rotary type.

The primary object of the present invention is to generally improve internal combustion engines with a view to increasing the power for a given displacement, decreasing the weight for a given displacement, increasing the efficiency, reducing vibration, and simplifying and cheapening the construction of such engines. These objects are fulfilled by an internal combustion engine of novel rotary type in which a driving plate, rotatable within a hollow working sphere, is variably intersected by a rotatable drum, the plate and drum dividing the hollow sphere into four expansion chambers in the form of spherical wedges of varying dihedral angle. With this arrangement the parts have uni-directional rotation, in contrast with the complete reversal of movement in reciprocating engines.

Further objects of my invention center about the valve mechanism for the engine, and include: the provision of appropriate inlet and exhaust valves for operating the expansion chambers in accordance with the four-stroke cycle or Otto cycle; the provision of valves of the sliding or sleeve type, thereby avoiding the complexity and noisiness of a poppet valve system and making available generously large intake and exhaust ports; the grouping of all of the valve ports on a single rotatable sleeve or cylinder; the provision of means for driving the valve cylinder in proper time relation to the engine rotation without necessitating external gear connection to the engine shaft; the provision of suitable intake and exhaust manifolds communicating with the valve ports and characterized by continuous smooth flow without abrupt change in direction; and the production of inherent heat exchange relationships within the engine, resulting in a desirable heating of the intake gas mixture, a desirable cooling of the exhaust gases, as well as cooling of the working sphere and engine parts as a whole.

Another object of my invention is to provide the expansion chamber at its minimum volume with a concentrated or lumped compression chamber of predetermined volume, thereby improving combustion and flame propagation, creating turbulence and facilitating exact design adjustment of the compression ratio of the engine. Still further objects of my invention center about the firing of the engine, and are: to arrange for firing of all four chambers at only two fixed points which may be provided with only two spark plugs for electrical ignition or only two spray injectors (with only two corresponding injector pumps), for Diesel operation; to protect the firing means during the major portion of the engine cycle, thus greatly lengthening the useful life thereof; and to relatively move the compression chamber and firing means during the firing step so that there is a wiping spread of the ignition.

Still further objects of my invention center about structural features of the engine which are of value regardless of whether or not the engine is operated as an internal combustion engine. Some of these features and corresponding objects of the invention provide a satisfactory working relation and gas seal between the drum and plate while permitting both relative oscillation and relative rotation of these elements. Other features and objects of the invention relate to the assembly of the engine shaft and driving plate, while still others concern the support of the drum on tapered bearings which center the parts properly in the working sphere, take both radial and axial thrust, and relieve the valve port surfaces, the valve cylinder, and manifold ports, of direct bearing load; while still others involve a judicious formation and subdivision of the drum and the casing as well as the plate to facilitate assembly of the parts of the engine.

To the accomplishment of the foregoing and such other objects as will hereinafter appear, my invention consists in the rotary engine elements and their relation one to the other, as hereinafter are more particularly described in the specification and sought to be defined in the claims. The specification is accompanied by drawings, in which:

Referring to the drawings, the rotary engine comprises a hollow working sphere S, a driving plate P rotatable in the sphere S, and a rotatable drum D extending across the sphere S and intersecting driving plate P. The plate P and drum D divide the spherical chamber S into four spherical wedge chambers which act as the four expansion chambers of the engine, corresponding to the cylinders of a four-cylinder engine. The axes of rotation of plate P and drum D intersect at an oblique angle, as will be evident from an inspection of the drawings, and consequently rotation of the plate and drum results in an oscillation of one of these elements with respect to the other, the oscillation being such as to increase or decrease the dihedral angle of the spherical wedge chamber constituting the pressure chamber. Two of the wedges are widened or opened, while the intermediate two are correspondingly narrowed or closed.

Figure 1:
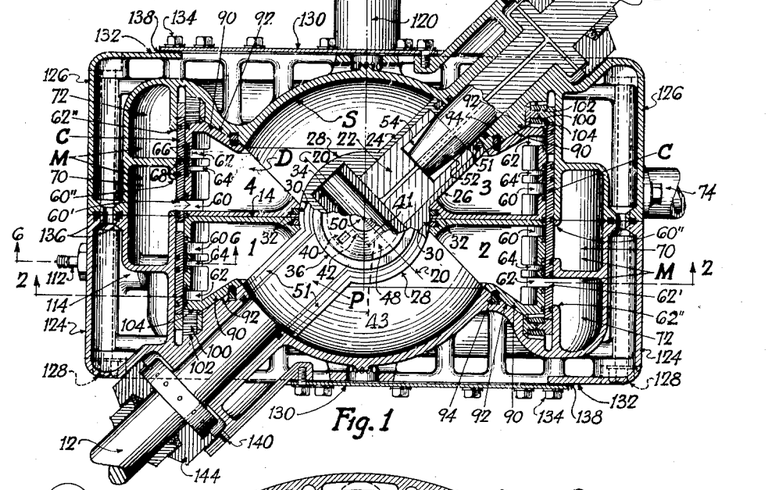
Fig. 1 is a section taken through the plane of the drum and engine shaft axes, in the plane of the line 1—1 of Fig. 2, with the driving plate perpendicular to the section.

The drum D is provided with appropriate compression chambers communicating directly with the spherical wedge expansion chambers of the engine, these compression chambers being numbered 1, 2, 3, and 4 in Fig. 1 of the drawings, and communicating respectively with the four expansion chambers which will hereafter be referred to by reference to the respective adjacent compression chambers. The outer or pheripheral wall of drum D is provided with appropriate intake, exhaust, and firing ports adapted to register with intake, exhaust, and firing ports in a valve cylinder C (best shown in Fig. 7), the valve cylinder C immediately surrounding the drum D and being rotatable relatively thereto. The valve cylinder C is itself immediately surrounded by appropriate intake and exhaust manifolds M extending annularly around the engine and opening directly upon registering ports of the valve cylinder. It will thus be evident that the manifolds M are in communication with the wedge chambers or expansion chambers in the working sphere S through the valve cylinder C and the compression chambers 1, 2, 3, and 4 of the drum D.

To better understand the mechanical movement involved in the present engine, the driving plate P may be visualized as a circular plane disc rotating on one of its diameters corresponding to the axis of the shafts 12, this imaginary disc bisecting the working sphere S and, upon rotation, bearing against the walls of the sphere. Similarly, the drum D is to be visualized as a plane disc corresponding to the dividing surface 14 of the halves of the split drum. This plane will, for convenience, be referred to as the drum and is rotatable on an axis 16 perpendicular to itself, passing through the center of the sphere and intersecting the axis of engine shafts 12 at an oblique angle. The planes P and D then intersect on a diameter 18 and divide the sphere into four spherical wedges. As the planes are rotated about their axes 12 and 16, they oscillate relative to one another about the aforesaid diameter of intersection 18, thereby varying the dihedral angle of the spherical wedges. Thus, if the drum D is considered as oscillating about the diameter 18 of plate P in a clockwise direction, as viewed in Fig. 1, the spherical wedge 2 decreases, corresponding to compression or exhaust, while the spherical wedge 1 increases, corresponding to intake or expansion, the spherical wedges 1 and 2 being supplements of one another. The spherical wedges 1 and 3 undergo similar and equal changes, the spherical wedge 1 at all times equaling the spherical wedge 3 in volume, and the spherical wedge 2 at all times equaling the spherical wedge 4 in volume. It will be understood, however, that the timing is such that compression in spherical wedge 3 corresponds to exhaust in spherical wedge 1, and vice versa, and that suction in spherical wedge 4 corresponds to expansion in spherical wedge 2, and vice versa.

The mechanical movement involved in this engine comprehends not only an oscillation of plate P with respect to drum D about the diameter 18 of the plate, but also a partial rotation or oscillation of that assumed diameter of intersection 18 about an axis 20 extending normally to the plate P and shaft 12. For example, in the position shown in Figs. 1 and 2 of the drawings, the diameter of intersection 18 is normal to axis 12, whereas in the position shown in Figs. 3 and 4 of the drawings the diameter of intersection 18 is oblique with respect to the axis 12. It is therefore necessary to visualize the dividing planes P and D so coupled together as to permit of this complex relative movement involving, as it does, a directly used relative oscillation about the diameter of intersection 18, and an indirectly produced and incidental relative rotation about the axis 20. At the same time, the gas-tight isolation of the four expansion chambers must, of course, be maintained.

Accordingly, important structural features of the present invention center about the manner in which the plate P and the drum D are coupled together to provide the desired relative movements while effectively preventing gas leakage. For this purpose, the driving plate P is laminated to form a middle plate 22 and side plates 24 and 26. The side plates 24 and 26 are provided with cylindrical bosses 28 extending diametrically across the outer surfaces of the side plates and together forming a cylindrical hub having the axis of intersection 18 as its axis. The innermost edges 30 of drum D terminate on the cylindrical bosses 28, as will be clearly evident from Figs. 1 and 2 of the drawings. The edges 30 are thus slidable about the cylindrical surface of bosses 28 to afford oscillation of drum D relative to plate P about the axis 18. A gas-tight fit is insured by the use of resilient pressure strips 32 in grooves formed on the inner edges 30 of the drum.

At the same time, the desirable oscillation or partial rotation of the drum D with respect to the plate P about the axis 18 is permitted by arranging the side plates or laminations 24 and 26 for rotation on the middle plate 22. For this purpose the middle plate 22 is preferably provided with a centering pin 34 passing through the middle plate and projecting outwardly into the side plates 24 and 26, ample room for receiving the ends of the centering pin 34 being provided by the cylindrical bosses 28. The fully enclosed condition of the centering pin 34 avoids any possibility of gas leakage thereat. In effect, therefore, the desired coupling between the plate and drum is obtained by the use of the cylindrical bosses and by permitting partial rotation of the bosses on the plate, but in order to prevent gas leakage from one chamber to its adjacent supplemental chamber beneath the cylindrical boss, the base of the boss is flared outwardly to itself form a complete circular plate (i. e. plates 24 and 26), thus eliminating one point of possible leakage.

Figure 3:
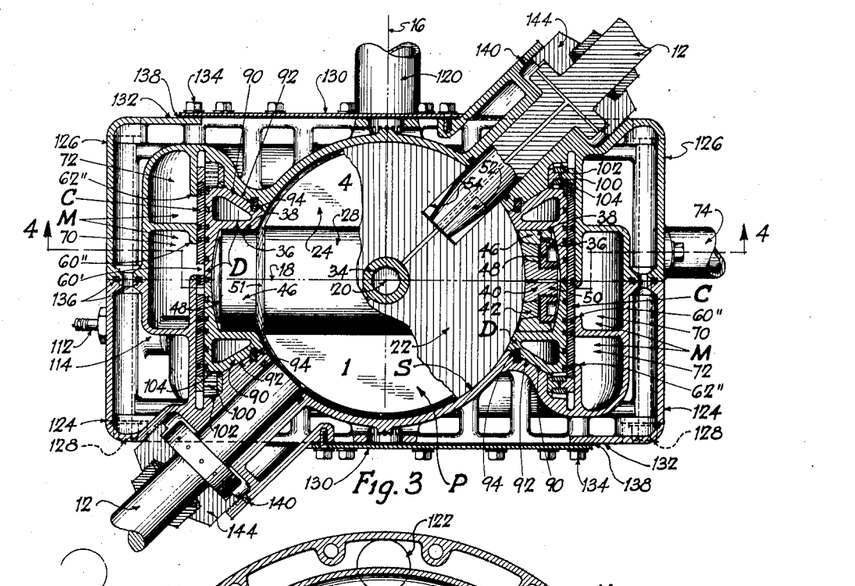
Fig. 3 is a section similar to Fig 1 but with the driving plate lying in the plane of the section, and is taken in the plane of the line 3—3 of Fig. 4.
Figure 4:
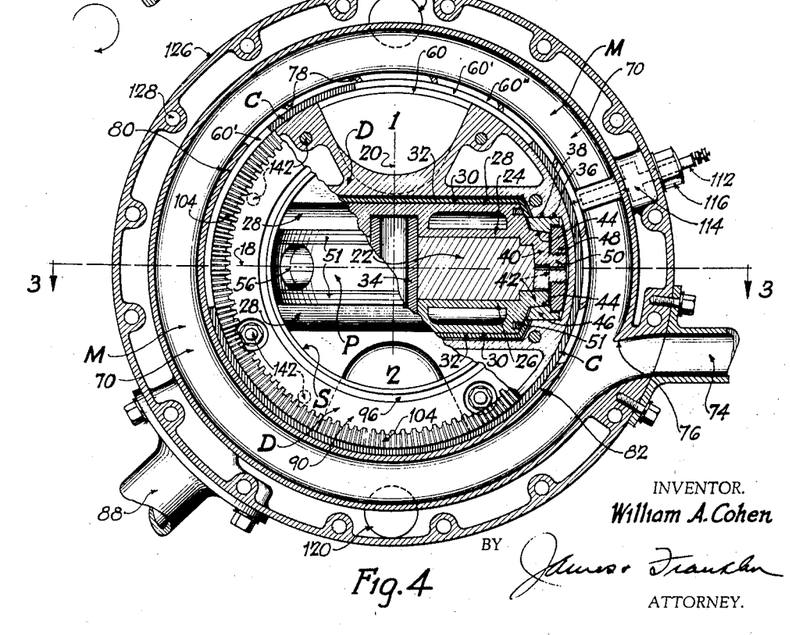
Fig. 4 is a section taken in the plane of the line 4—4 of Fig. 3.
Figure 5:
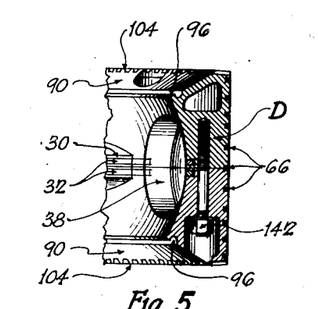
Fig. 5 is a fragmentary section through the periphery of the drum, taken on the line 5—5 in Fig. 2.

To properly guide the relative oscillation of drum D and plate P about the axis of intersection 18, reliance is not placed merely upon the cylindrical bosses 28, but rather upon a pair of trunnions 36 formed outside of the periphery of plate P (and outside of the working sphere) at the ends of the diameter of intersection 18, and received in bearings 38 formed directly in the drum D, as is shown in Figs. 3 and 4 of the drawings, one of the bearings 38 being most clearly shown in Fig. 5.

To form the trunnions 36 and at the same time to provide for adjustment of the friction between the middle and side plates of the driving plate, the following construction is adopted. The side plates 24 and 26 have mating extensions 40 and 42 the outer edges of which form a frustro-conical surface 44 over which there is forced a bearing ring 46 having a tapered inner surface and a cylindrical outer surface, the said cylindrical outer surface acting as the bearing surface of the trunnion, generally designated 36. A nut 48 is screwed upon a threaded projection 50 formed on the extension 40, and bears against bearing ring 46. It will be evident that by tightening the nut 48, the bearing ring 46 may be forced inwardly on the conical surface 44 of extensions 40 and 42, thereby bringing the side plates 24 and 26 closer together and increasing the friction between the side plates and the middle plate 22. This adjustment in no way affects the seating of the trunnions 36 in bearings 38, because the outer surface of the trunnion (pointed to by lead line of numeral 36 in Figs. 3 and 4) is cylindrical. To hold the extensions 40 and 42 in alignment, they are preferably mated, one fitting into the other, as is best shown in Fig. 1 of the drawings, the depending part 41 of the extension 40 fitting into a mating recess 43 in extension 42.

To form a gas-tight seal between the plate assembly P and the spherical chamber S, the edge of the plate assembly is provided with expanding spring rings 51, fitting in mating grooves formed preferably at the edges of the side plates 24 and 26. These spring rings prevent leakage of gas from one chamber to another around the edges of the plate assembly and, because of their location as shown, prevent escape of gas around the engine shafts 12 and the escape of gas around the trunnions 36.

The engine shafts 12 are provided with tapered ends 52 and splines 54, and are driven with a force fit into mating holes 56 in the middle plate 22. When assembled, the middle plate and the shafts 12 form a single rigid rotatable member, the plate assembly revolving within the spherical chamber and transferring its driving torque to the shafts 12, the outer end of either of which may be extended to act as the engine shaft, and either of which may, if desired, be provided with an appropriate fly-wheel, not shown herein, although less fly-wheel effect is necessary with the present rotary type of engine than in the case of an ordinary reciprocating engine.

Figure 6:
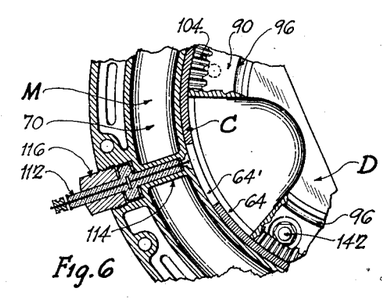
Fig. 6 is a fragmentary section through one of the spark plugs, taken in the plane of the line 6—6 in Fig. 1.

The drum D may be in the form of a relatively thin plate, in which case the minimum volume of the expansion chambers will be a spherical wedge having an acute dihedral angle. In accordance with a further and important feature of the present invention, the portion of the drum D extending within the working sphere S is itself made wedge-shaped, with an angle substantially fully occupying the minimum angle of the chamber. This reduces the volume of the expansion chamber within the working sphere to a theoretical zero, but an actual compression chamber of predetermined volume in a concentrated or lumped form is provided by hollowing out the side of the drum leading directly into the expansion chamber. In Fig. 1, it will be noted that while the expansion chambers partially formed by compression chambers 2 and 4 are open to their maximum volume, the expansion chambers formed with compression chambers 1 and 3 have been reduced to a minimum volume consisting solely of the volume of the compression chambers 1 and 3 within the drum D, for the adjacent side faces of the plate P and drum D have come substantially into contact. The relatively concentrated or lumped shape of the compression chambers 1, 2, 3, and 4 is evident from an inspection of Figs. 2, 4, and 6 of the drawings, and is to be contrasted with the spread or fan shape which would obtain if the drum D were not shaped to occupy the working sphere in the manner shown. The concentrated compression chamber insures more efficient ignition. The localization of the compression chamber in the drum makes it readily possible when designing any particular model of the engine to vary the volume and thus the compression ratio of the engine. The communication between the expansion chamber and the compression chamber causes turbulence of the gas during compression, which itself aids ignition. Furthermore, the compression chamber is itself used as a direct communication of generous size between the expansion chamber and the various valve ports.

The valves are formed by annular or peripheral slots cut on the outer surface of the drum D. The location of these ports determines their registration with corresponding ports in valve cylinder C and in manifolds M. Referring to Fig. 1, the inlet ports are shown at 60 and the exhaust ports at 62. These ports preferably equal in length the full opening of the compression chamber, as is best shown by the exhaust port 62 in Fig. 2 or the inlet port 60 in Fig. 4. As a convenient method of firing the charge in the compression chambers, the drum D is preferably further provided with firing ports 64 which, in the present case, are located between the inlet and exhaust ports 60 and 62. The outer surface of the drum D is provided with a series of expansion spring rings 66 which seal the ports against gas leakage.

Figures 7, 8, 9, 10, 11:
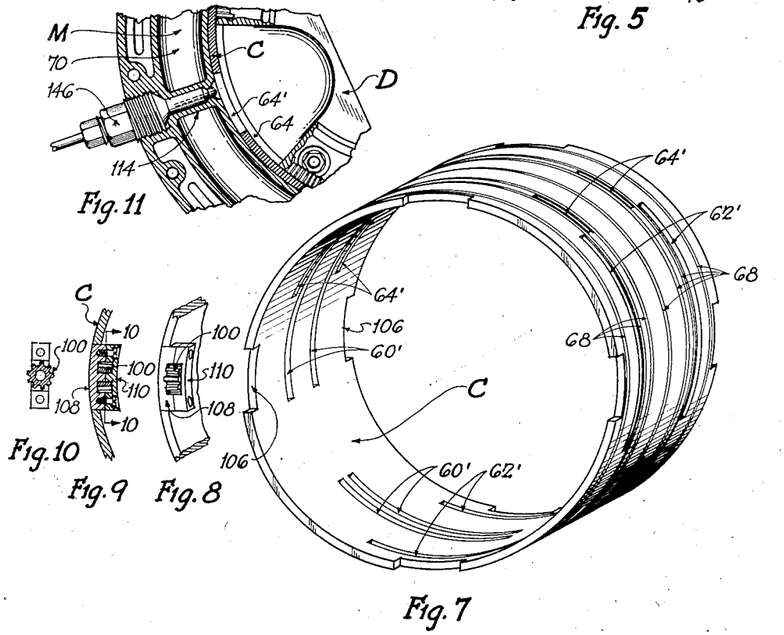
Fig. 7 is a view of the valve cylinder in oblique projection, with the planetary gear carriages removed.
Fig. 8 is a similar view at the left of Fig. 7, with the planetary gear carriage in position.
Fig. 9 is a vertical section through the gear carriage.
Fig. 10 is a section taken in the plane of the line 10—10 of Fig. 9.
Fig. 11 is a modification for Diesel operation.

The valve cylinder C is best shown in Fig. 7, and comprises a single cylindrical sleeve valve through which there are cut appropriate inlet, exhaust, and firing ports 60', 62', and 64' which are properly located to register with the ports 60, 62, and 64 respectively. The distribution of the ports 60', 62', and 64' around the surface of the valve cylinder determines the timing of the valve system of the engine. The outer surface of the valve cylinder is also preferably provided with a series of expansion spring rings 68 which again serve to seal the various ports or passages against side leakage.

The valve cylinder C is immediately surrounded by the manifolds M including a preferably centrally located intake manifold 70 and collaterally disposed exhaust manifolds 72. The intake manifold 70 extends annularly entirely around the engine, as is best shown in Fig. 4. An appropriate carbureter, not shown, is connected to the intake pipe 74, opening directly into the annular manifold 70. The gas is distributed entirely around the manifold, and any unused gas may join the fresh gas entering through pipe 74, the point of juncture preferably being provided with a deflector 76 tending to accelerate and insure circulation of the gas. While a single manifold serves for all of the expansion chambers, it will be understood that the manifold is cut away to form two sidewardly as well as peripherally displaced inlet ports 60", shown in Figs. 1 and 3. One of these inlet ports 60" is shown in Fig. 4; and it will be noted that the casing is preferably strengthened by retaining a considerable number of cross webs 78 connecting the sides of the slot or port 60". The other inlet port is similar to that described, but is displaced sidewardly in a manner clearly evident from an inspection of Fig. 1 or 3, and, of course, is displaced peripherally 180°, it extending between the points 80 and 82 in Fig. 4.

Figure 2:
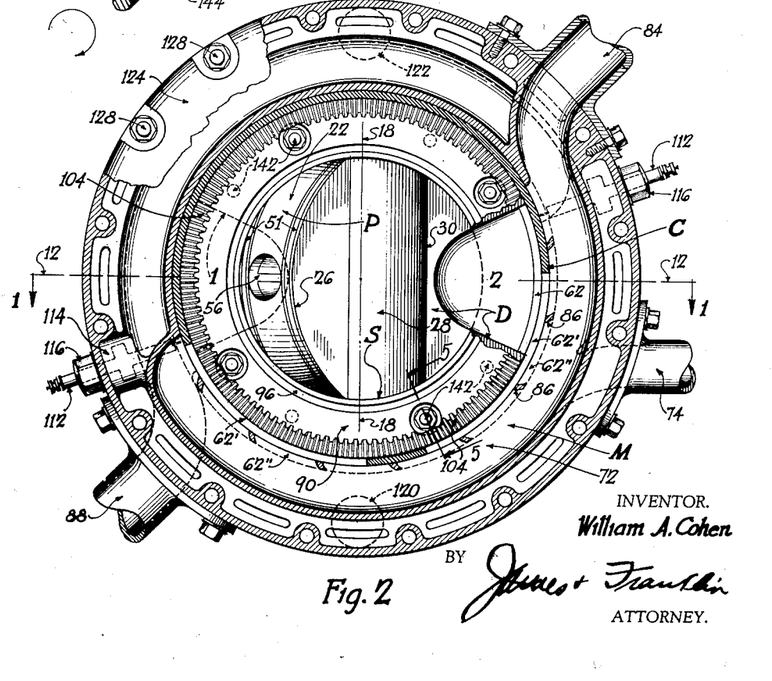
Fig. 2 is a section taken in the plane of the line 2—2 of Fig. 1.

One of the exhaust manifolds 72 is clearly shown in Fig. 2, and it will be evident that the manifold extends approximately halfway around the engine casing and discharges into an appropriate exhaust pipe 84. Here again the relatively long slot or port 62" is preferably strengthened by retaining a number of webs 86. The opposite exhaust manifold extends about halfway around the engine in the opposite direction and discharges into a separate exhaust pipe 88. When preferred, the exhaust manifolds 72 may be led to a common exhaust pipe by slightly varying the shape of the casting forming the engine casing. In the present case separate exhaust pipes 84 and 88 have been shown, in order to simplify the drawings and to facilitate understanding of the primary features of the invention.

The drum D is preferably provided with a relatively broad periphery in order to provide ample room for the valve ports. The annular portion of the drum lying outside of the working sphere is then tapered inwardly in cross-section, forming tapered side walls 90 bearing against mating walls 92 of the casing. The resulting tapered bearing supports the drum for rotation, while taking both radial and axial thrust. This permits self-centering of the drum with respect to the working sphere, and takes all bearing load away from the valve cylinder C and the manifold M, thus minimizing wear and increasing the operating life of the engine. In practice, appropriate bearing surfaces are interposed between the surfaces 90 of the drum and the surfaces 92 of the casing, but these bearings have been omitted in the present drawings. In addition, these parts are provided with packing rings 94 which press into annular grooves 96 on the sides of the drum, best shown in Fig. 5. The purpose of this packing is to prevent gas leakage from the expansion chambers into the tapered bearing 90, 92, and to prevent gas leakage around the drum.

In operation, the valve cylinder C must be rotated and, as is well known in this art, for four-stroke or Otto cycle operation the valve cylinder should be rotated at half the speed of the engine, which corresponds to half the speed of the drum D. Although there is a slight speed fluctuation of drum D for a truly uniform rotation of shaft 12, this does not affect the distribution of ports in the valve cylinder, because the valve cylinder is driven by the drum itself. The valve timing is with reference to the drum rotation. In the present construction the valve cylinder is given the desired rotation in an exceedingly simple manner without necessitating external gear connection to the engine shaft. This result is accomplished by providing the drum with planet or idler pinions 100 which mesh on one side with a stationary ring of gear teeth 102, and on the other side with a rotatable ring of gear teeth 104 formed directly on the surface of the drum. The formation of the gear teeth 104 on the drum is clearly evident from inspection of Figs. 2, 4, and 5. The construction of the planet pinions 100 and the manner in which they are mounted on the valve cylinder are readily understood by reference to Figs. 7 to 10, in which it will be noted that the valve cylinder is cut away or recessed at 106 to receive a pinion carriage 108 which in turn carries the pinion 100, the pinion being received between the outer portion 108 of the carriage and a cover portion 110 bolted thereto. The ring 102 of gear teeth formed on the engine casing is similar to that formed on the outer surface of the drum. It will be noted that upon rotation of the drum, the pinions 100 are rotated, thus causing them to travel around the stationary gear ring 102. As the pinions 100 revolve planetwise, they carry the valve cylinder C around at the desired half speed.

The engine is further provided with appropriate firing means for the compression chamber. In the engine shown in Figs. 1 to 6, the firing is accomplished by electrical ignition, and for this purpose the engine casing is provided with a pair of spark plugs 112 which pass through an appropriate protective tube 114 of the engine casing, the arrangement being clearly shown in Fig. 6. From this figure it will be understood that the insulated spark plug is preferably locked in place by an appropriate nut 116. It will be observed that the spark plugs are located for registration with the firing ports 64 and 64' of the drum D and valve cylinder C. The firing port 64' is, of course, timed for approximately proper firing, while the exact timing is determined by the ignition distributor head which may be connected to the spark plugs in conventional fashion. It will be noted that only two spark plugs are needed for the firing of all four chambers, this firing being, of course, successive. Either a four-point contact distributor head may be used, with successive contacts connected to each spark plug, the distributor head being geared to the engine shaft with the conventional speed reduction of 2 to 1; or a two-point contact distributor head may be used, with a two-armed rotor, the arms being at an angle of 90°, and also rotated at half the speed of the engine shaft. The spark plug is normally protected from the chamber by the valve cylinder, and its useful life is thereby greatly lengthened. The spark is applied to a charge of combustible gas which is exposed directly thereto and yet which is moved or wiped along the spark, thus improving the flame propagation through the charge.

The engine casing (124, 126) is generally cylindrical in form and provides ample cooling water spaces for jacketing the working sphere S, the manifolds M, and the engine shaft bearings. Cooling water is preferably supplied through an inlet 120 near the bottom of the casing, and withdrawn through an outlet 122 near the top of the casing. An appropriate radiator of conventional type, not shown, is used to permit recirculation of the cooling water. The cooling water flows substantially throughout the outer portions of the engine casing in a manner which, it is believed, will be self-evident from the drawings, and which, therefore, need not be described in detail. It may be pointed out, however, that the casing is made of two halves 124 and 126 which are bolted together by a peripheral series of through bolts 128. The sides of the casing are closed by side plates 130 secured to the edge 132 of the casing by a series of screws 134. Appropriate gaskets or packing 136 and 138 are interposed between the halves of the casing and between the casing and the side plates to prevent leakage of the cooling water.

The castings forming the engine casing are, in practice, provided with appropriate supports for mounting the engine. These have been omitted in the present drawings because they vary widely in accordance with the use to which the engine is put. The supports ordinarily provide for mounting of the engine in parallel relation to the drive shaft, and may be located at the level of the drive shaft for automotive purposes, or at the level of the bottom of the casing for stationary use.

The engine is lubricated by force feed lubrication the details of which have been omitted from the present drawings in order to simplify the same. In a general way, however, it may be pointed out that oil is forced through the working parts of the engine by way of appropriate oil pipe connections 140, permitting the transfer of oil through the engine shafts 12 and thence to the center pin 34 and the side plates of the driving plate assembly, and so forth.

The drum D, like the engine casing itself, is preferably split and made up of two symmetrical halves joined by appropriate bolts 142, this construction being most clearly shown in Fig. 5 of the drawings. This and a number of other structural features of the invention arise primarily to facilitate assembly of the engine, and a brief description of the mode of assembly may therefore not be amiss. The driving plate P is first assembled by placing the side plates 24 and 26 around the middle plate 22, with the centering pin 34 in place. This assembly is completed by applying the bearing rings 36 and tightening the nuts 48 until the proper fit is obtained. The expanding spring rings 51 are then snapped into their grooves, thus completing the unit. The driving plate assembly is then passed through the diametrical space between the inner edges 30 of one half of the split drum D, the trunnions 36 being meanwhile located in the bearings 38. The other half of the drum is then applied, the spring pressure strips 32 being preliminarily in place. The halves of the drum are thereupon bolted together by a series of stud bolts 142, alternate ones passing through opposite sides of the drum, as will be evident from an inspection of Figs. 2 and 5 of the drawings. The expanding spring rings 66 are then pulled over the drum and snapped into position on the outer periphery thereof. The valve cylinder C is then placed around the drum D, and the gear carriages with their planet pinions, are fitted in their slots and locked in place, the pinions meshing with the gear rings 104 on the outer surface of the drum. The expanding spring rings 68 are placed on the valve cylinder.

The parts as thus far assembled are inserted as a single unit into one half of the engine casing. Care must be taken to set or time the valve cylinder properly just before permitting the pinions to go into mesh with the stationary gear ring 102. One of the engine shafts 12 is then passed through the casing and into the driving plate. It may be held in place by a thrust bearing nut 144, best shown in Figs. 1 and 3 of the drawings. The other half of the casing is then applied, the various gaskets and packing rings being preliminarily located in position, after which the halves of the casing are bolted together by the series of bolts 128. The other engine shaft 12 is then inserted through the casing and into the driving plate. To obtain an exceedingly tight or practically frozen fit between the engine shafts and the driving plate, the engine shafts are forced toward one another in an appropriate cradle vice while either rocking or rotating the engine casing about the shafts, thus insuring proper centering of the shafts in the driving plate and proper centering of the driving plate in the working sphere.

The engine is readily modified for Diesel operation. For this purpose the firing means, instead of taking the form of the spark plugs 112 shown in Fig. 6, take the form of the oil injection spray nozzles 146 one of which is shown in Fig. 11. It will be understood that, quantitatively considered, the compression chamber is substantially reduced in volume, for in Diesel operation the compression ratio is of the order of 14 to 1 instead of only 5 to 1 as in gasoline operation with electrical ignition. It will be readily appreciated that two injection nozzles 146 are employed, replacing the spark plug 112, and that these are fed with fuel oil under high pressure by appropriate injection pumps, not shown, which replace the distributor head used for electrical ignition, and which are similarly geared to the engine shaft for proper timing. Only two injection pumps are needed, the operating cams for these pumps being each provided with double lifts, normally spaced 90° apart. The present engine is particularly valuable for Diesel operation because the engine weight is greatly reduced for a given displacement and this reduction makes the Diesel engine reasonably light in weight even though the higher pressures involved necessitate heavier construction.

The foregoing description suffices for a full understanding of the general principles underlying my invention. For those interested in considering the mattter in a more quantitative way, I shall next set forth design data concerning a specific embodiment of the invention. Those not interested in this type of information may skip the next section of the specification.

The specific engine to be considered is one having a diameter of 7½ inches for the spherical chamber, an angle of 45° between the axes of rotation of the drum and the engine shaft, a total displacement of 154 cubic inches, and a compression ratio of 5.23. The cylindrical boss of the plate about which the drum oscillates is 3½ inches in diameter.

Figure 12:
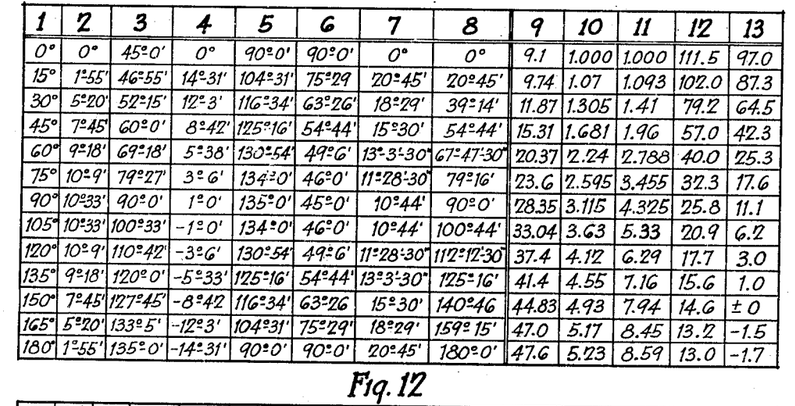
Figs. 12 and 12—A together form a table of design data.
Figure 12A:
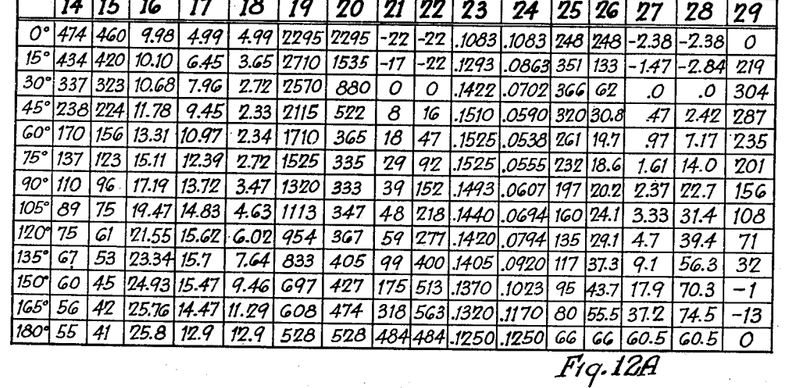

Referring to Fig. 12 of the drawings, I there set forth a single table which has been physically divided into two parts to fit on the sheet. In use, the lower half, containing columns 14 through 29, may be considered as placed at the right of the upper half, containing columns 1 through 13. In theory, the table may be considered in two parts divided by the double line between the eighth and ninth columns. Columns 1 through 8 are more general than columns 9 through 29, for they involve the geometry of the parts during the rotation of the engine and are generally applicable to all cases in which the axes of rotation of the drum and shaft are at an angle of 45°. Columns 9 through 29 of the table are specific to the engine already referred to, having a displacement of 154 cubic inches.

Column 1 of the table gives the assumed positions of rotation of the driving plate, the resulting data being given for each 15° increment of rotation of the plate. All figures horizontally opposite this column are the values for the various factors when at that particular position of rotation. While column 1 shows angular changes running only from zero to 180°, or covering only a half revolution, the factors for the remaining half revolution are obtained from those given for the first half revolution considered in reverse order.

Column 2 sets forth the increase in the degrees of the dihedral angle of the spherical wedge for the 15° increments of rotation in column 1.

Column 3 gives the actual dihedral angle of the spherical wedge, this wedge beginning at 45° and having added thereto the increases shown in column 2.

Column 4 gives the increase in degrees of the central angle of the positive sector, and this, of course, corresponds to the decrease in the central angle of the negative sector. At this point it may be remarked that, due to the oscillation of the axis 18 about the axis 20, the effective driving area is a variable rather than a constant. The gas pressure against the driving plate produces both positive and negative torque with respect to the engine shaft 12. The area of the semicircular portion of the driving plate exposed to pressure of the gas is divided variably on either side of the axis of rotation 12, thus forming a positive and negative sector. It is the change in the angle of this sector which is set forth in column 4.

Column 5 gives the actual central angle of the positive sector.

Column 6 gives the actual central angle of the negative sector. It will be noted that in the first line of the table the positive and negative sectors are equal, producing no effective turning moment. This corresponds, by analogy, to dead-center in the reciprocating type of engine, and it is with respect to this that the zero degree position of the driving plate has been selected.

Column 7 shows the degrees rotation of the drum for each 15° of rotation of the driving plate. In other words, this column sets forth quantitatively the fluctuation in the speed of the drum for uniform rotation of the engine shaft.

Column 8 shows the total angle of rotation of the drum incident to the rotations of the driving plate set forth in column 1. It may be remarked that at each quarter revolution the engine shaft and drum rotate at the exact same velocity.

Beginning with column 9 the data in columns 1 through 8 are specifically applied to the 154 cubic inch displacement engine previously referred to.

Column 9 indicates the volume in cubic inches of the compression or combustion chamber, plus that of its expanding spherical wedge in the working sphere. The fully expanded spherical wedge has a volume of 38.5 cubic inches, and, for a compression ratio of 5.23, the compression chamber volume is 9.1 cubic inches.

Column 10 indicates the compression ratio, which is the ratio of the volume of the combustion chamber plus the spherical wedge to the volume of the combustion chamber alone. This is arrived at by dividing the values in column 9 by 9.1 cubic inches.

Column 11 indicates the value of each successive compression ratio after raising the same to a power or exponent of 1.3, this being the exponent of the pressure-volume curve.

Column 12 indicates the absolute compression pressures of the gas in pounds per square inch while being compressed in the combustion chamber, and is based on the assumption that the gas in the chamber when at its maximum volume has an initial pressure of 13 pounds per square inch absolute.

Column 13 indicates the gauge compression pressures in pounds per square inch, which are arrived at by subtracting 14.7 pounds from the absolute pressures in column 12.

Column 14 indicates the absolute pressures in pounds per square inch upon ignition and combustion of the previously compressed gas, which are arrived at by multiplying the absolute pressures in column 12 by 4.25, this being the proper factor for a compression ratio of 5.23.

Column 15 indicates the gauge compression pressures in pounds per square inch, which are arrived at by subtracting 14.7 pounds from the absolute pressures in column 14.

It may be remarked that the compression of a charge in one chamber always occurs simultaneously with combustion of a charge in another chamber. Therefore the negative work of compression must be subtracted from the positive work of combustion. Also, the positive sector exposed to combustion is equal to the negative sector exposed to compression, and the negative sector exposed to combustion is equal to the positive sector exposed to compression. Columns 17 and 18 are values for the positive and negative sectors of the driving plate when exposed to combustion only. Therefore, those columns which have the positive sector of compression as a factor use the sector values taken from column 18, and those which have the negative sector of compression as a factor use the sector values taken from column 17. Columns 23 and 24 are the moment arm values corresponding with the positive and negative sectors in columns 17 and 18, and consequently are also interchanged when used for sectors exposed to compression.

Column 16 indicates the total area in square inches of the driving plate exposed to gas pressure.

Column 17 indicates the area in square inches of the positive sector of the driving plate exposed to combustion.

Column 18 indicates the area in square inches of the negative sector of the driving plate exposed to combustion.

Column 19 indicates the gauge total combustion pressures acting on the varying area of the positive sector, these being arrived at by multiplying column 15 by column 17.

Column 20 indicates the gauge total combustion pressures acting on the varying area of the negative sector, these being arrived at by multiplying column 15 by column 18.

Column 21 indicates the gauge total compression pressures acting on the varying area of the positive sector, these being arrived at by multiplying column 13 by column 18.

Column 22 indicates the gauge total compression pressures acting on the varying area of the negative sector, these being obtained by multiplying column 13 by column 17.

Column 23 indicates the positive moment arm in feet of the varying positive sector exposed to combustion.

Column 24 indicates the negative moment arm in feet of the varying negative sector exposed to combustion.

Column 25 indicates the positive turning moments in pound feet of the gauge total combustion pressures acting on the positive sector and tending to cause rotation in a positive direction about the engine shaft. These values are arrived at by multiplying column 19 by column 23.

Column 26 indicates the negative turning moments in pound feet of the gauge total combustion pressures acting on the negative sector and tending to cause rotation in a negative direction about the engine shaft. These values are obtained by multiplying column 20 by column 24.

Column 27 indicates the positive turning moments in pound feet of the gauge total compression pressures acting on the positive sector and tending to cause rotation in a positive direction. These values are obtained by multiplying column 21 by column 24.

Column 28 indicates the negative turning moments in pound feet of the gauge total compression pressures acting on the negative sector and tending to cause rotation in a negative direction, these values being obtained by multiplying column 22 by column 23.

Column 29 indicates the final positive turning moments causing rotation of the engine shaft, which are arrived at by subtracting the negative turning moments of columns 26 and 28 from the positive turning moments of columns 25 and 27.

A resultant theoretical average turning moment or torque imparted to the engine shaft is next determined by taking the average of the values in column 29, this being 133 pound feet. The values of column 29 are plotted in Fig. 13 together with the broken line indicating the average turning moment.

Figure 13:
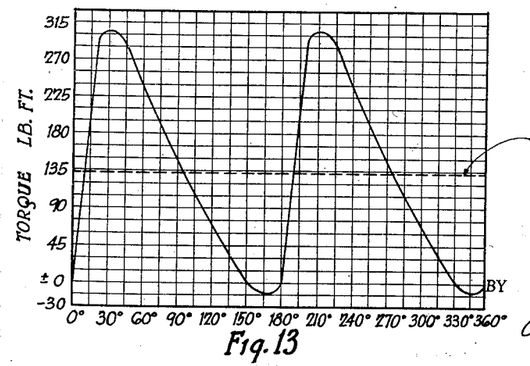
Fig. 13 is a turning moment diagram.

The results shown in Figs. 12 and 13 help emphasize an important advantage of the present engine, for the turning moment is exceptionally high for the displacement of the engine. Comparing the present engine with a typical four-cylinder automobile engine having a similar displacement, the theoretical average turning moment is 18% higher in the present engine than in the conventional reciprocating engine of similar displacement.

Figures 14, 16:
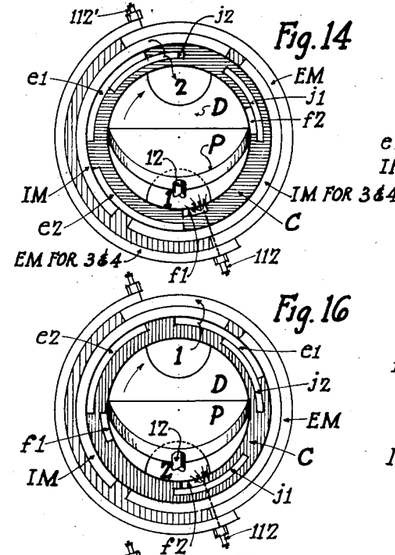
Figs. 14 through 21 are schematic representations of the engine, showing successive stages in the operation of chambers 1 and 2 at 90° intervals of rotation of the drum.

The operation of my engine may be reviewed by reference to Figs. 14 through 21 of the drawings which indicate the important parts of the engine in schematic fashion. Fig. 14 may be considered as a section taken in the plane of the line 2—2 of Fig. 1 of the drawings, and therefore corresponds in a general way to Fig. 2 except that the drawings have been oriented for 90° about the axis of the drum, thus bringing the engine shaft 12 in a vertical plane instead of in a horizontal plane. It is as though Fig. 2 were held with the left-hand side of the sheet at the bottom. The drum is indicated by D, while the compression chambers therein are indicated by the numbers 1 and 2. It will be understood that only one side, the forward side of the engine is exposed, and the forward part of the plate is indicated by P. The valve cylinder C has its ports displaced axially along the cylinder, as is clearly shown in Fig. 7, but for the present schematic showing these ports have been indicated as displaced radially instead of axially. Similarly, the intake and exhaust manifolds, which lie in collaterally disposed or axially displaced formation in the engine casing, as is clearly shown in Figs. 1 and 3, are displaced radially in schematic Fig. 14 in order to bring the same into view.

Figure 15:
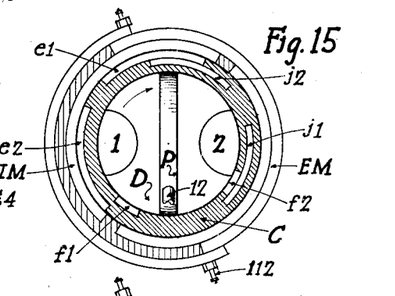
Figure 17:
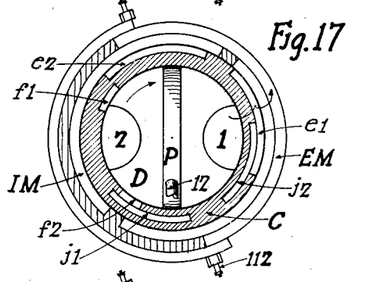
Figure 18:
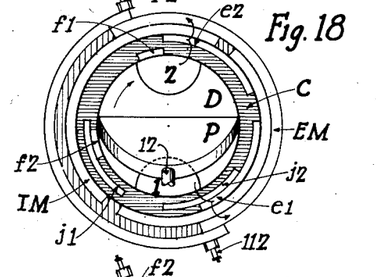

Figs. 15, 16, 17, etc. are similar to Fig. 14 but show successive positions of the drum and plate for each 90° rotation of the drum. Fig. 18 is like Fig. 14 but at the completion of a single revolution of the drum. If Fig. 14 is referred to after Fig. 21, it represents the completion of two revolutions of the drum. During this time the valve cylinder C has revolved only one complete revolution, for it moves at half the speed of the drum. Thus, successive Figs. 14, 15, 16, 17, etc. indicate successive positions of the valve cylinder at increments of 45°.

Figures 19, 21:
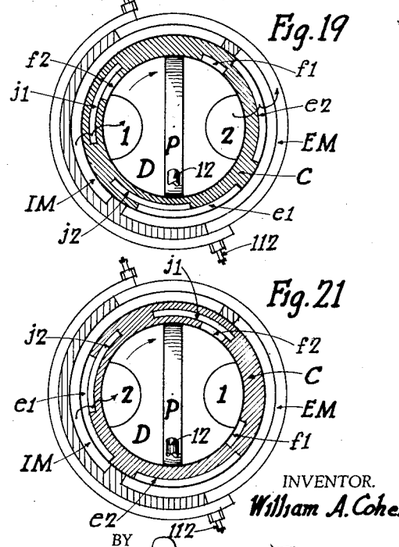
Figure 20:
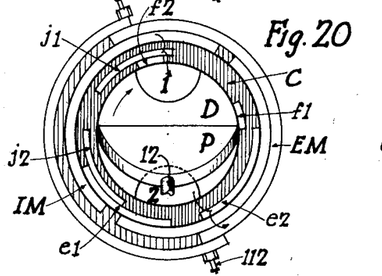

Referring now to Fig. 14, chamber 1 has finished compression and is firing. It will be noted that spark plug 112 is energized; that firing port f1 is aligned with spark plug 112; and that intake port i1 and exhaust port e1 are remote from chamber 1, the chamber being sealed during compression and expansion. The chamber then expands, and in Fig 15 chamber 1 is shown in the midst of expansion. It will be noted that plate P is at right angles to drum D, the chamber having opened from the acute-angled relation shown in Fig. 14 to the right-angled relation shown in Fig. 15. Near the end of expansion the chamber begins to exhaust, and this is indicated in Fig. 16 by the jump arrow leading from chamber 1 through exhaust valve port e1 and into the exhaust manifold EM. Note that chamber 1 has now opened to an obtuse-angled relation from which point it begins to close and continues closing throughout the exhaust movement. In Fig. 17 chamber 1 is shown in the midst of exhaust, it remaining in communication with exhaust manifold EM through exhaust valve port e1. In Fig. 18 chamber 1 has closed to its minimum volume and is just finishing its exhaust stroke. It is still in communication with the exhaust manifold but is about to begin intake upon slight additional movement. Suction or intake continues substantially during the succeeding expansion of chamber 1, and Fig. 19 shows the parts in the midst of intake. Suction or intake is indicated on the diagram by the jump arrow leading from intake manifold IM through intake valve port i1 to chamber 1. Fig. 20 shows continued intake but this is changed to compression soon after, and in Fig. 21 chamber 1 is contracting and is in the midst of compression. The cycle is completed by reverting to Fig. 14 which shows the completion of compression and the moment of firing of the compressed charge.

The operation of chamber 2 is the same as has already been outlined except for a change in time. It will be recalled that the intake and exhaust manifolds IM and EM are common to chambers 1 and 2. In Fig. 14 chamber 2 is completing suction or intake, as is indicated by the jump arrow leading from the intake manifold IM through intake valve port i2 and into chamber 2. This is followed by compression, as is shown in Fig. 15, the chamber having meanwhile contracted from the fully open or obtuse-angled relation of Fig. 14 to the partially closed or right-angled relation of Fig. 15. In Fig. 16 compression has just been completed in chamber 2, it having closed to minimum volume, and spark plug 112 is again firing but this time firing port f2 registers with the spark plug and results in ignition of the charge in chamber 2. Ignition is followed by expansion, and Fig. 17 shows the middle of the expansion stroke. In Fig. 18 chamber 2 has finished its useful expansion stroke and has already begun to exhaust, this being indicated by the jump arrow leading from chamber 2 through exhaust valve port e2 into exhaust manifold EM. Exhaust continues in Fig. 19 and is just finishing in Fig. 20. Intake or suction then begins, and Fig. 21 shows chamber 2 in the midst of the intake movement. The suction stroke is continued in Fig. 14 but is nearly completed and compression is about to begin.

The operation of the engine with respect to chambers 3 and 4 need not be reviewed in detail, for the sequence is exactly like that already described, the only difference being that the parts of the engine are displaced 180°. Thus, referring to Fig. 14, the intake manifold for chambers 3 and 4 is diametrically opposite the intake manifold IM for chambers 1 and 2; exhaust manifold for chambers 3 and 4 is diametrically opposite the exhaust manifold EM for chambers 1 and 2; and the spark plug 112' for chambers 3 and 4 is diametrically opposite spark plug 112 for chambers 1 and 2. The symmetrical nature of the engine has probably been made manifest from the description of the drawings Figs. 1 through 10. If it is kept in mind that chamber 3 is in back of chamber 2 and corresponds to chamber 1, while chamber 4 is in back of chamber 1 and corresponds to chamber 2, the description of Figs. 14 through 21 heretofore given may be applied to chambers 3 and 4, it being understood that the intake manifold will then be that marked "IM for 3 and 4", while the exhaust manifold will be that marked "EM for 3 and 4", and the spark plug will be that marked 112'. Relating the timing of chambers 3 and 4 to chambers 1 and 2, I may refer to Fig. 18 as corresponding to the time of firing in chamber 3, and to Fig. 20 as corresponding to the time of firing in chamber 4. Thus, Figs. 14, 16, 18, and 20 respectively indicate the successively firing of chambers 1, 2, 3, and 4 at 180° intervals of rotation.

It is believed that the mode of constructing and operating my improved rotary internal combustion engine, as well as the many advantages thereof, will be apparent from the foregoing detailed description. The engine is characterized by increasing power for a given volumetric displacement, decreased weight for a given volumetric displacement, increased efficiency, and reduced vibration and noise. The valve construction is simple, subject to little wear, quiet, and provides ample ports. The operation of the valve mechanism is obtained in a simple manner. The manifolding is generous and continuous, without abrupt changes in direction of flow. The intake and exhaust manifolds are in collateral juxtaposition, resulting in heat transfer which improves the vaporization of the inlet gases. Excessive heating is avoided because the inlet and exhaust manifolds are jacketed by cooling water, and this helps reduce the exhaust back pressure. The expansion chambers are in the form of a spherical wedge of variable dihedral angle, and yet the compression chamber is concentrated in shape as well as predetermined in volume. The arrangement provides for direct communication between the valve ports and the compression chamber, and the compression chamber is itself used for direct communication with the expansion chamber. The firing or ignition is simplified because only two firing means are needed for the four chambers; the firing means is protected by the valve cylinder; and the ignition is applied directly in the compression chamber and through a wiping or moving contact which improves the ignition.

From a structural viewpoint, the parts are made ample in dimension and easy to assemble. The driving plate and drum are coupled so as to permit a sort of universal relative movement including both oscillation and rotation, and yet gas leakage between the various chambers is effectually prevented. Gas leakage around the centering pin, the trunnions, the shafts, and the drum bearings is likewise avoided. The radial and axial bearing load of the drum is taken on tapered bearings independent of the valve cylinder and manifolds, thus avoiding wear at the valve ports. Rotation of the valve cylinder at a desired speed for four-stroke cycle operation is obtained without the necessity of gearing the valve cylinder to the driving shaft.

There is an increase in power for a given displacement because the average length of the moment arm of the driving plate is greater than the average length of the moment arm of an equivalent crank shaft. There is a saving in bulk and weight of approximately 40%, compared to a reciprocating engine of equivalent displacement, and this is important for use as a Diesel engine.

It will be apparent that while I have shown and described my invention in preferred forms, many changes and modifications may be made in the structures disclosed, without departing from the spirit of the invention, defined in the following claims. In the said claims I refer to the two rotatable elements which form the expansion chambers as a driving plate and a drum, but this terminology is adopted merely for convenience of reference to the two different driving elements, and the use of the term "drum" is not intended to limit the thus-referred to element as necessarily having a wide periphery or an actual drum shape. It will be evident from the foregoing specification that the drum may be relatively narrow, and that it is only for convenience in providing ample room for valve ports, in providing tapered bearings for the drum, and in filling the minimum expansion chamber wedge, that the drum is preferably given the wide construction herein disclosed. In referring to registration of the various valve ports and manifolds, I refer, of course, to registration in an axial direction, because rotation of the parts affords only intermittent and properly timed registration in a rotative sense. In referring to firing means, I comprehend both electrical ignition and injection for Diesel operation.

I claim:

1. A rotary internal combustion engine comprising a casing forming a hollow working sphere, a driving plate rotatable within said sphere on an engine shaft extending diametrically of said plate, a rotatable drum crossing said sphere at an oblique angle with respect to the engine shaft, inlet and exhaust ports on the periphery of said drum communicating with the chambers, a valve cylinder surrounding said drum, intake and exhaust manifolds surrounding said valve cylinder, and means to rotate said valve cylinder.

2. A rotary internal combustion engine comprising a working chamber, a coupled plate and drum rotatable in said chamber and intersecting to form expansion chambers therein, inlet and exhaust ports on the periphery of said drum communicating with the chambers, a valve cylinder surrounding said drum, intake and exhaust manifolds surrounding said valve cylinder, planet pinions secured to said valve cylinder, a stationary ring of gear teeth meshing with said pinions, and a rotatable ring of gear teeth formed on the drum and meshing with said pinions, whereby said valve cylinder is rotated at half the speed of the drum.

3. A rotary internal combustion engine comprising a casing forming a hollow working sphere, a driving plate rotatable within said sphere on an engine shaft extending diametrically of said plate, a rotatable drum crossing said sphere at an oblique angle with respect to the engine shaft and intersecting the plate to form expansion chambers, inlet and exhaust ports on the periphery of said drum communicating with the chambers, a valve cylinder surrounding said drum, intake and exhaust manifolds surrounding said valve cylinder, planet pinions secured to said valve cylinder, a stationary ring of gear teeth meshing with said pinions, and a rotatable ring of gear teeth formed on the drum and meshing with said pinions, whereby said valve cylinder is rotated at half the speed of the drum.

4. A rotary internal combustion engine comprising a casing forming a hollow working sphere, a driving plate rotatable within said sphere on an engine shaft extending diametrically of said plate, a rotatable drum crossing said sphere at an oblique angle with respect to the engine shaft, said drum and plate intersecting to form four expansion chambers in the form of spherical wedges of variable dihedral angle, inlet, exhaust, and firing ports on the periphery of said drum communicating with the chambers, a valve cylinder having inlet, exhaust, and firing ports surrounding said drum, intake and exhaust manifolds surrounding said valve cylinder, firing means registrable with the firing ports, planet pinions secured to said valve cylinder, a stationary ring of gear teeth meshing with said pinions, and a rotatable ring of gear teeth formed on the drum and also meshing with said pinions.

5. A rotary internal combustion engine comprising a generally cylindrical casing having at its center a hollow working sphere, a circular driving plate rotatable within said sphere on an engine shaft extending diametrically of said plate, a rotatable drum crossing said sphere at an oblique angle with respect to the engine shaft to form expansion chambers, inlet and exhaust ports on the periphery thereof and communicating with the chambers, a valve cylinder having mating inlet and exhaust ports immediately surrounding said drum, the outer portion of the casing being annularly partitioned to form central and outer annular manifolds the inner surfaces of which immediately surround the valve cylinder and are cut away to form passages registering with the valve ports, and means to rotate the valve cylinder.

6. A rotary internal combustion engine comprising a generally cylindrical casing having at its center a hollow working sphere, a circular driving plate rotatable within said sphere on an engine shaft extending diametrically of said plate, a rotatable drum crossing said sphere at an oblique angle with respect to the engine shaft to form expansion chambers, inlet, exhaust, and firing ports extending in an annular direction on the periphery thereof and communicating with the chambers, a valve cylinder having inlet, exhaust, and firing ports and immediately surrounding said drum, the outer portion of the casing being annularly partitioned to form central and outer annular manifolds the inner surfaces of which immediately surround the valve cylinder and are cut away to form passages registering with the valve ports, firing means registrable with the firing ports, planet pinions secured to said valve cylinder, a stationary ring of gear teeth in said housing and meshing with said pinions, and a rotatable ring of gear teeth on the drum meshing with said pinions, whereby said valve cylinder is rotated at half the speed of the drum.

7. A rotary internal combustion engine comprising a casing forming a hollow working sphere, a circular driving plate rotatable within said sphere on an engine shaft extending diametrically of said plate, a rotatable drum crossing said sphere at an oblique angle with respect to the engine shaft and intersecting said plate on a diameter thereof, said drum and plate intersecting to form four expansion chambers in the form of spherical wedges of variable dihedral angle, the four adjacent portions of the drum within the sphere each being wedge-shaped at an angle substantially fully occupying the minimum angle of the chamber, and having a compression chamber formed in the side thereof, intake and exhaust ports formed on the periphery of the drum and communicating with the compression chambers, a valve cylinder having registering intake and exhaust ports immediately surrounding the drum, intake and exhaust manifolds surrounding the valve cylinder, and means to rotate the valve cylinder.

8. A rotary internal combustion engine comprising a casing forming a hollow working sphere, a coupled driving plate and drum rotatable within said sphere and intersecting to form four expansion chambers in the form of spherical wedges of variable dihedral angle, the four adjacent portions of the drum within the sphere each being wedge-shaped at an angle substantially fully occupying the minimum angle of the chamber, and having a compression chamber of predetermined and concentrated volume formed in the side thereof, intake, exhaust, and firing ports formed on the periphery of the drum and communicating with the compression chambers, a valve cylinder immediately surrounding the drum and having registering intake, exhaust, and firing ports, intake and exhaust manifolds and firing means outside the valve cylinder, and means to rotate the valve cylinder.

9. A rotary internal combustion engine comprising a casing forming a hollow working sphere, a circular driving plate rotatable within said sphere on an engine shaft extending diametrically of said plate, a rotatable drum crossing said sphere at an oblique angle with respect to the engine shaft, said drum and plate intersecting to form four expansion chambers in the form of spherical wedges of variable dihedral angle, intake and exhaust valves communicating with said chambers, means coupled to the rotatable part of the engine for operating said valves in proper time sequence for four-stroke cycle operation of the engine, and two firing means projecting through the casing and serving to fire the four expansion chambers.

10. A rotary internal combustion engine comprising a casing forming a hollow working sphere, a circular driving plate rotatable within said sphere on an engine shaft extending diametrically of said plate, a rotatable drum crossing said sphere at an oblique angle with respect to the engine shaft, said drum and plate intersecting to form four expansion chambers, intake, exhaust, and firing ports formed on the periphery of the drum and communicating with the chambers, a valve cylinder having registering intake, exhaust, and firing ports surrounding the drum, intake and exhaust manifolds surrounding the valve cylinder, two firing means projecting through the casing to register with the firing ports and serving to fire the four expansion chambers, and means to impart appropriate rotation to the valve cylinder.

11. A rotary engine comprising a casing forming a hollow working sphere, a circular driving plate assembly rotatable within said sphere on an engine shaft extending diametrically of said plate, a rotatable drum crossing said sphere at an oblique angle with respect to the engine shaft and intersecting said plate to form expansion chambers, said plate assembly including a middle plate and relatively oscillatable side plates, said side plates mating oscillatably with the innermost edges of the drum.

12. A rotary engine comprising a casing forming a hollow working sphere, a circular driving plate assembly rotatable within said sphere on an engine shaft extending diametrically of said plate, a rotatable drum crossing said sphere at an oblique angle with respect to the engine shaft and intersecting said plate to form expansion chambers, said plate assembly including a middle plate, relatively oscillatable side plates, and a center pin concentrically relating said plates, said side plates carrying cylindrical bosses extending diametrically thereacross, the innermost edges of the drum bearing slidably against said cylindrical bosses during the opening and closing of the expansion chambers.

13. A rotary engine comprising a casing forming a hollow working sphere, a circular driving plate assembly rotatable within said sphere on an engine shaft extending diametrically of said plate, a rotatable drum crossing said sphere at an oblique angle with respect to the engine shaft and intersecting said plate to form expansion chambers, said plate assembly including a middle plate, relatively oscillatable side plates, and a center pin concentrically relating said plates, said side plates carrying cylindrical bosses extending diametrically thereacross, the innermost edges of the drum bearing slidably against said cylindrical bosses during the opening and closing of the expansion chambers, said plate and drum being further interconnected by trunnions formed on the plate assembly at the extremities of the cylindrical bosses and carried in bearings on the drum.

14. A rotary engine comprising a casing forming a hollow working sphere, a circular driving plate rotatable within said sphere on an engine shaft extending diametrically of said plate, a rotatable drum crossing said sphere at an oblique angle with respect to the engine shaft and intersecting said plate on a diameter thereof, said plate including a middle plate, relatively oscillatable side plates, and cylindrical bosses extending diametrically thereacross, the innermost edges of the drum bearing slidably against said cylindrical bosses, and means to adjust the friction between the middle and side plates.

15. A rotary engine comprising a casing forming a hollow working sphere, a circular driving plate rotatable within said sphere on an engine shaft extending diametrically of said plate, a rotatable drum crossing said sphere at an oblique angle with respect to the engine shaft and intersecting said plate on a diameter thereof, said plate including a middle plate and relatively oscillatable side plates, the innermost edges of the drum mating with a part of the side plates, said plate and drum being further interconnected by trunnions at the extremities of the intersection, each trunnion including mating extensions of the side plates having conical outer surfaces received within a bearing ring having a tapered inner surface, adjustable means for forcing the bearing ring on the extensions and thereby adjusting the friction between the side and middle plates, the outer surface of the bearing ring being cylindrical and received in mating bearings of the drum.

16. A rotary engine comprising a casing forming a hollow working sphere, a circular driving plate rotatable within said sphere on an engine shaft extending diametrically of said plate, a rotatable drum crossing said sphere at an oblique angle with respect to the engine shaft and intersecting said plate to form expansion chambers, the annular outer portion of said drum being inwardly tapering in cross-section from a relatively wide periphery, and stationary bearing surfaces receiving the tapered sides of the drum and rotatably supporting the same both radially and axially.

17. A rotary engine comprising a casing forming a hollow working sphere, an engine shaft, a circular driving plate rotatable within said sphere on said engine shaft, said shaft extending diametrically of said plate, a rotatable drum crossing said sphere at an oblique angle with respect to the engine shaft and intersecting said plate to form expansion chambers, the annular outer portion of said drum being inwardly tapering in cross-section from a relatively wide periphery, valve ports formed on the periphery of said drum and communicating with said chambers, and stationary bearing surfaces receiving the tapered sides of the drum and rotatably supporting the same both radially and axially.

18. A rotary engine comprising a casing forming a hollow working sphere, a circular driving plate rotatable within said sphere on an engine shaft extending diametrically of said plate, a rotatable drum crossing said sphere at an oblique angle with respect to the engine shaft and intersecting said plate on a diameter thereof, trunnions on said plate at the extremity of the diameter of intersection, said intersecting drum and plate forming four expansion chambers in the form of spherical wedges of variable dihedral angle, said drum being split perpendicular to the axis thereof to form symmetrical halves, and means locking the same together, said halves forming split bearings therebetween for receiving the trunnions of the driving plate.

19. A rotary engine comprising a casing forming a hollow working sphere, an engine shaft, a circular driving plate rotatable within said sphere on said engine shaft, said shaft extending diametrically of said plate, a rotatable drum crossing said sphere at an oblique angle with respect to the engine shaft and intersecting said plate on a diameter thereof to form expansion chambers, trunnions on said plate at the extremity of the diameter of intersection, said drum being inwardly tapering in cross-section from a relatively wide periphery, valve ports formed on the periphery of said drum and communicating with said chambers, stationary bearing surfaces receiving the tapered sides of the drum and rotatably supporting the same both radially and axially, said drum being split perpendicular to the axis thereof to form symmetrical halves, and means locking the same together, said halves forming split bearings therebetween for receiving the trunnions of the plate.

20. A rotary engine comprising a split casing forming a hollow working sphere between the halves thereof, engine shafts, a circular driving plate rotatable within said sphere on said engine shafts, said shafts extending diametrically of said plate and passing through the casing and having their inner ends driven with a force fit into mating holes in the edges of the driving plate, a rotatable drum crossing said sphere at an oblique angle with respect to the engine shafts and intersecting said plate to form four expansion or working chambers, inlet and exhaust ports on the periphery of said drum leading into said chambers, inlet and exhaust valve mechanism for opening and closing said ports in proper time sequence for four-stroke cycle operation of the engine, and firing means for said chambers.

21. A rotary engine comprising a split casing forming a hollow working sphere between the halves thereof, a circular driving plate assembly including middle and side plates rotatable as a unit within said sphere on engine shafts extending diametrically of said plate assembly, said engine shafts passing through the casing and having their inner ends driven with a force fit into mating holes in the edges of the middle plate, a rotatable drum crossing said sphere at an oblique angle with respect to the engine shafts and intersecting said plate assembly to form expansion chambers, the innermost edges of the drum mating with portions of the side plates for oscillation thereon, said side plates being themselves oscillatable on the middle plate.

22. A rotary internal combustion engine comprising a casing forming a hollow working sphere, a driving plate rotatable within said sphere on an engine shaft in the plane of said plate, a rotatable drum crossing said sphere at an oblique angle with respect to the engine shaft, said drum and plate intersecting to form movable expansion chambers, a valve cylinder surrounding said drum, intake and exhaust ports communicating with said chambers through said valve cylinder, mechanism rotating said valve cylinder for opening and closing said ports, and firing means for igniting the charge in the movable chambers.

23. A rotary engine comprising a casing defining a working chamber, a coupled driving plate and drum rotatable within said chamber and intersecting to form expansion chambers therein, said drum rotating about its cylindrical axis, intake and exhaust connections through the casing outside the periphery of the drum, and intake and exhaust ports on the periphery of said drum for effecting communication between said connections and the chambers through the drum.

24. A rotary internal combustion engine comprising a casing forming a hollow working sphere, a circular driving plate rotatable within said sphere on an engine shaft extending diametrically of said plate, a rotatable drum crossing said sphere at an oblique angle with respect to the engine shaft and intersecting said plate on a diameter thereof, said drum rotating about its cylindrical axis, said drum and plate intersecting to form four similar expansion chambers in the form of spherical wedges of variable dihedral angle, the four adjacent portions of the drum within the sphere each being wedge-shaped at an angle substantially fully occupying the minimum angle of the chamber, and each having a compression chamber formed in the side thereof, intake and exhaust connections through the casing outside the periphery of the drum, and intake and exhaust ports in the periphery of the drum for effecting communication between said connections and the chambers through the drum.

25. A rotary internal combustion engine comprising a casing defining a working chamber, a coupled driving plate and drum rotatable within said chamber, said drum rotating about its geometrical axis and said drum and plate intersecting to form four expansion or working chambers, intake and exhaust connections through the casing outside the periphery of the drum, intake and exhaust ports for effecting communication between said connections and said four chambers through the periphery of said drum, intake and exhaust valve mechanism for controlling the opening and closing of said ports, and two firing means projecting through the casing and serving to fire the four expansion chambers.

WILLIAM A. COHEN.